(12) United States Patent
Ban

(10) Patent No.: US 9,411,869 B2
(45) Date of Patent: Aug. 9, 2016

(54) REPLICATION BETWEEN SITES USING KEYS ASSOCIATED WITH MODIFIED DATA

(71) Applicant: Red Hat, Inc., Raleigh, NC (US)

(72) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 269 days.

(21) Appl. No.: 13/937,571

(22) Filed: Jul. 9, 2013

(65) Prior Publication Data

US 2015/0019812 A1 Jan. 15, 2015

(51) Int. Cl.
*G06F 17/30* (2006.01)
*G06F 12/08* (2016.01)

(52) U.S. Cl.
CPC ...... *G06F 17/30578* (2013.01); *G06F 12/0813* (2013.01)

(58) Field of Classification Search
None
See application file for complete search history.

(56) References Cited

U.S. PATENT DOCUMENTS

| 2005/0193041 | A1* | 9/2005 | Bourbonnais et al. ........ 707/204 |
| 2011/0082908 | A1* | 4/2011 | Ban .............................. 709/213 |
| 2012/0317395 | A1* | 12/2012 | Segev et al. ................... 711/216 |
| 2014/0115251 | A1* | 4/2014 | Belluomini et al. .......... 711/113 |
| 2014/0129519 | A1* | 5/2014 | Leshchiner ................... 707/613 |
| 2014/0215260 | A1* | 7/2014 | Lim et al. ..................... 714/4.11 |

* cited by examiner

*Primary Examiner* — Brian Peugh
*Assistant Examiner* — Dustin Bone
(74) *Attorney, Agent, or Firm* — Haynes and Boone, LLP

(57) ABSTRACT

Systems and methods are disclosed for replicating data stored in an in-memory data cache to a remote site. An example system includes an in-memory data cache and an in-memory keys cache. The system also includes a key insert module that detects a modification to the in-memory data cache, identifies one or more keys of the plurality of keys based on the modification, and inserts the identified one or more keys into the in-memory keys cache. The system further includes an update module that retrieves from the in-memory keys cache a set of keys, retrieves from the in-memory data cache modified data associated with the set of keys, and transmits to a remote site a modification list including the set of keys and the modified data associated with the set of keys.

20 Claims, 6 Drawing Sheets

200

| ACCOUNT NUMBER | MOVIES | START DATE | ACCESS |
|---|---|---|---|
| K1 | A | 01/29/2013 | Y |
|  | B | 02/14/2013 | N |
| K2 | A | 01/01/2013 | N |
| K3 | B | 01/15/2013 | Y |

204, 206, 208, 210, 304, 302

200

| ACCOUNT NUMBER | MOVIES | START DATE | ACCESS |
|---|---|---|---|
| K2 | A | 01/01/2013 | N |
| K3 | B | 01/15/2013 | Y |

REPLICATION BETWEEN SITES USING KEYS ASSOCIATED WITH MODIFIED DATA

BACKGROUND

The present disclosure generally relates to in-memory caches, and more particularly to replication of in-memory caches.

An in-memory cache may be synchronously replicated across sites. Synchronous replication may be reliable because the source node sending a copy of the in-memory data receives acknowledgements from one or more destination nodes indicating that the data was received. A large amount of data may be sent to the destination nodes (e.g., multiple modifications of the same data). If a single node of the destination nodes fails to send the source node an acknowledgement, the whole operation may fail. The time it takes to achieve a successful commit or a roll-back may be quite long.

Additionally, the more nodes in the set of participating nodes, the higher the likelihood is that something may go wrong. For example, if the set of participating nodes includes N nodes and the probability of one participating node failing to apply the transaction based on the first communication is two percent, then the overall probability of the transaction failing is (N*2) %. For example, if N is five the failure probability is 10%, and if N is ten the failure probability is 20%, and so on. Further, communications between the local and remote sites include multiple components, e.g., the bridge and site master that dispatches to the right target at the remote site. Accordingly, N may include not only the participants, but also these components.

BRIEF SUMMARY

It may be desirable to provide a fast and reliable technique to replicate in-memory caches that overcome the disadvantages discussed above. This disclosure relates to replication of in-memory caches between sites. Methods, systems, and techniques for asynchronously replicating data from an in-memory data cache in a first site to a remote in-memory data cache in a second site are provided.

According to an embodiment, a system for replicating an in-memory data cache includes an in-memory data cache that stores a plurality of keys and data associated with the plurality of keys. The system also includes an in-memory keys cache that stores keys associated with modified data. The system further includes a key insert module that detects a modification to the in-memory data cache, identifies one or more keys of the plurality of keys based on the modification, and inserts the identified one or more keys into the in-memory keys cache. The system also includes an update module that retrieves from the in-memory keys cache a set of keys, retrieves from the in-memory data cache modified data associated with the set of keys, and transmits to a remote site a modification list including the set of keys and the modified data associated with the set of keys. At least one node in the remote site is updated using the set of keys and the modified data associated with the set of keys.

According to another embodiment, a method of replicating an in-memory data cache includes detecting, by one or more processors, a modification to an in-memory data cache, the in-memory data cache storing a plurality of keys and data associated with the plurality of keys. The method also includes identifying one or more keys of the plurality of keys based on the modification. The method further includes inserting the identified one or more keys into an in-memory keys cache. The method also includes retrieving from the in-memory keys cache a set of keys and retrieving from the in-memory data cache modified data associated with the set of keys. The method further includes transmitting to a remote site a modification list including the set of keys and the modified data associated with the set of keys. At least one node in the remote site is updated using the set of keys and the modified data associated with the set of keys.

According to another embodiment, a non-transitory machine-readable medium includes a plurality of machine-readable instructions that when executed by one or more processors are adapted to cause the one or more processors to perform a method including detecting a modification to an in-memory data cache, the in-memory data cache storing a plurality of keys and data associated with the plurality of keys; identifying one or more keys of the plurality of keys based on the modification; inserting the identified one or more keys into an in-memory keys cache; retrieving from the in-memory keys cache a set of keys; retrieving from the in-memory data cache modified data associated with the set of keys; transmitting to a remote site a modification list including the set of keys and the modified data associated with the set of keys, where at least one node in the remote site is updated using the set of keys and the modified data associated with the set of keys.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
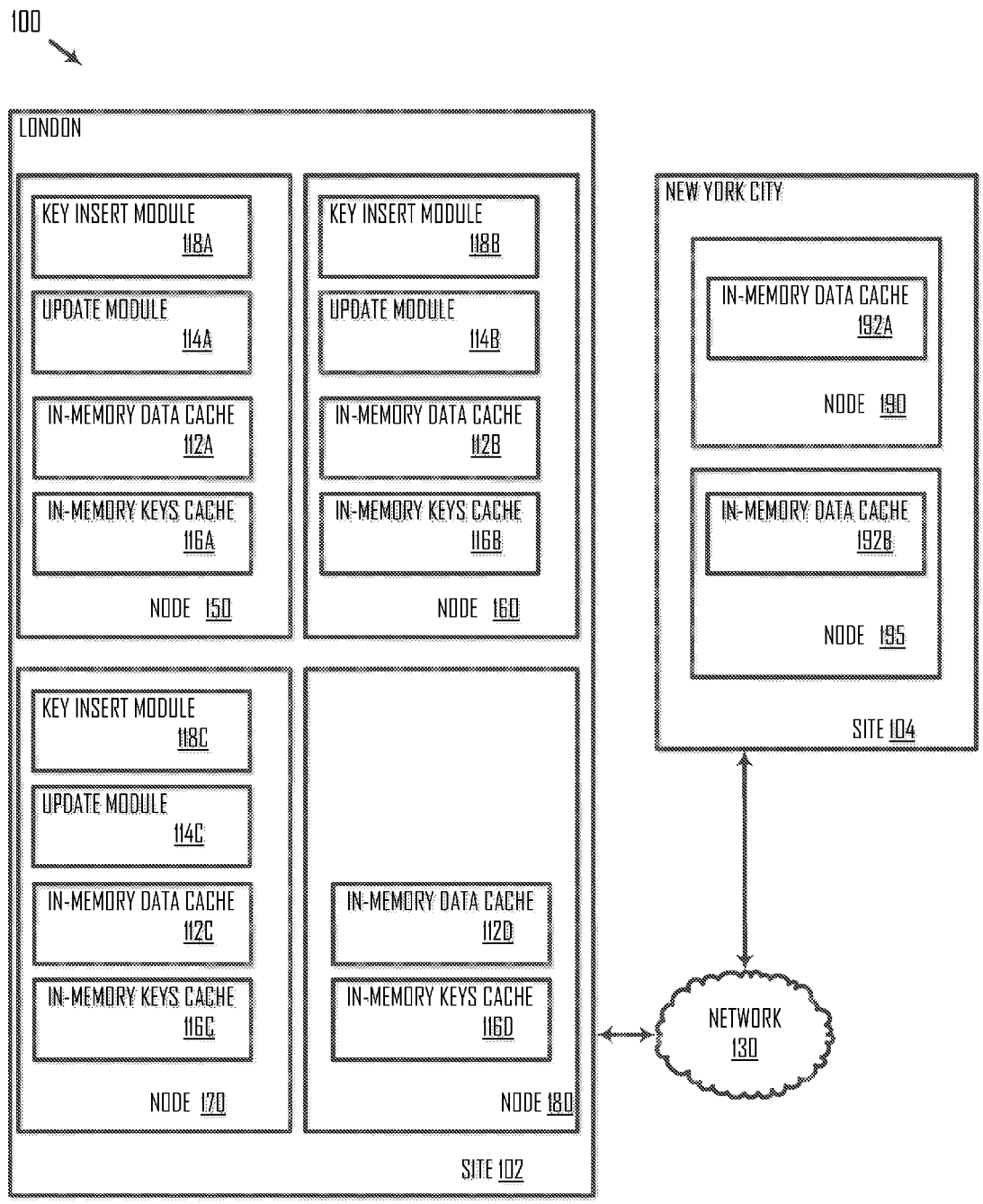
FIG. 1 is a simplified block diagram illustrating a system for asynchronously replicating data to a remote site, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview

II. Example System Architecture

A. Insert Keys Into In-Memory Keys Cache

1. Backup Instances Local to the Site

2. Key Updaters Local to the Site

B. Replicate Data to a Remote Site Using Keys Stored Locally in In-Memory Keys Cache
  C. Remove Locally Stored Keys From In-Memory Keys Cache
  D. Crashed Node and New Node Local to the Site
III. Example Approach
  A. Data Replication to a Remote Site
  B. Example Queue Implementation
  C. Conflict Resolution
IV. Example Method
V. Example Computing System It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

I. Overview

Data may be asynchronously replicated between geographically separate sites. A site may refer to a local cluster of nodes. Cross site replication may allow backing up of data from one site to one or more other sites, potentially situated in different geographical locations. Asynchronous data replication may be faster than synchronous data replication and may provide other benefits as described in this disclosure. Although the disclosure may describe data being replicated between geographically separate sites, it should also be understood that data may be replicated within a local site using the techniques described in the present disclosure.

For example, in asynchronous data replication, if a source node in a local site replicates data to a set of nodes in a remote site and the source node fails to receive an acknowledgement from a node of the set of nodes in the remote site, it may be unnecessary for the source node to resend the data to each node of the set of nodes in the remote site. Rather, the source node may send the data to the particular node that had failed to successively deliver an acknowledgement. Sending the data to this particular node rather than all of the nodes may reduce the amount of data sent between sites. Additionally, asynchronous replication may be faster than synchronous replication because it may be unnecessary for the source node to wait for the acknowledgements of the destination nodes.

Synchronous replication may run a two-phase commit. In a first phase when the transaction is committed, a "prepare" message is sent to the participating nodes. When the acknowledgements have been received, a "commit" message or a "rollback" message is sent. The "commit" message may be sent when all of the nodes apply the "prepare" message. The "rollback" message may be sent when one or more nodes fails to apply the "prepare" message, or when some nodes crash or have left (e.g., were not reachable) the process. Performing this two-phase commit may be time consuming.

In another example, synchronous replication across sites may include sending the "prepare" message to the site master of a remote site, which in turn applies the "prepare" message to its local cluster (e.g., by forwarding the "prepare" message to all nodes that have keys involved in the transaction and are waiting for acknowledgements). When the site master has collected the "prepare" responses, it sends the acknowledgement back to the originator of the transaction (e.g., in the originating site). Performing this two-phase commit may also be time consuming.

Sites may be connected via a high-throughput/high-latency link (e.g., approximately 50-70 milliseconds). In an example, neglecting the cost of a local two-phase commit, a two-phase commit across two sites may cost (assuming 50 milliseconds of latency) approximately 150-200 milliseconds. The "prepare" call to the remote site plus the response (approximately 100 milliseconds) and similar for the "commit" or "rollback" message (100 milliseconds) may cost approximately 200 milliseconds. If the second phase were asynchronous, the cost may be reduced to approximately 150 milliseconds.

It may be desirable to avoid sending the "prepare" message to the remote site(s) as part of the two-phase commit. This may reduce latency and the quantity of participants, which mitigates the probability of failure.

Further, in asynchronous replication, a high quantity of nodes in the remote site may receive replicated data without significantly contributing to the failure probability. This is in contrast to synchronous data replication, which may have a significantly higher failure rate with each added destination node. For example, as discussed above regarding synchronous data replication, the more nodes in the set of participating nodes, the higher the likelihood is that something may go wrong.

An embodiment of the present disclosure may provide the following advantages among others. An embodiment may be highly reliable because no updates are lost unless the entire primary site crashes. In this case, updates applied during the lag time period may be lost. Communication lost between the primary and backup site(s), however, may not lead to data loss because when connectivity is restored, a resynchronization of the backup site(s) may be triggered.

An embodiment may have the correct ordering of updates. In an example, all updates are applied at the backup site(s) in the order in which they were sent. An embodiment may provide for fast replication. In an example, it may take no more than a few milliseconds to commit a synchronous transaction. An embodiment may have a configurable lag time. In an example, the backup site(s) are no more than N milliseconds (configurable) behind the primary site. The present disclosure provides techniques that combine the speed of asynchronous replication with the reliability of synchronization replication as further discussed below.

II. Example System Architecture

FIG. 1 is a simplified block diagram 100 illustrating a system for asynchronously replicating data to a remote site, according to an embodiment.

Diagram 100 includes a site 102 in London and a site 104 in New York City. Site 102 is remote from site 104, and each node in site 102 is remote from the nodes in site 104. Each site may have one or more nodes. A node local to a site may refer to a node residing in that site.

Site 102 includes four nodes 150, 160, 170, and 180 that are local to site 102. Node 150 includes an in-memory data cache 112A, update module 114A, in-memory keys cache 116A, and key insert module 118A. Node 160 includes an in-memory data cache 112B, update module 114B, in-memory keys cache 116B, and key insert module 118B. Node 170 includes an in-memory data cache 112C, update module 114C, in-memory keys cache 116C, and key insert module 118C. Node 180 includes an in-memory data cache 112D and in-memory keys cache 116D. Although all of the nodes in site 102 include the in-memory data cache and in-memory keys cache, this is not intended to be limiting. In another embodiment, a site may include a node that does not include the in-memory data cache and/or in-memory keys cache.

In site 102, a quantity of nodes that includes the in-memory data cache and in-memory keys cache may increase or decrease depending on various factors such as whether a new node is launched in site 102 or whether a currently existing node in site 102 leaves. Depending on the role of the node, the components in a node may be active or inactive in the node. In an example, each node includes the in-memory keys cache, and the in-memory keys cache is active only on a node that replicates changes. In another example, the update module is active only on a node that sends updates to the remote site.

Site 104 includes two nodes 190 and 195 that are local to site 104. Node 190 includes an in-memory data cache 192A, and node 195 includes an in-memory data cache 192B.

Sites 102 and 104 are coupled to a network 130. Network 130 may connect two or more sites, and nodes in one site may communicate with nodes in another site via network 130. Network 130 may include various configurations and use various protocols including the Internet, World Wide Web, intranets, wide area networks (WAN), and various combinations of the foregoing. In an example, network 130 is a WAN with high latency.

Sites 102 and 104 may be located in different geographic regions. Thus, sending data from site 102 to site 104 may result in high latency. This disclosure provides techniques to make the latency of in-memory cache replication between sites a non-dominating factor when replicating between geographically separate sites.

Data stored in in-memory data cache 112A in site 102 may be asynchronously replicated to one or more nodes (e.g., node 192A and/or node 192B) in remote site 104. In-memory data cache 112A stores a plurality of keys and data associated with the plurality of keys. In-memory data cache 112A may be, for example, a data store maintained by a movie rental company that provides movies online. The movie rental company may provide a movie to a customer for a limited amount of time (e.g., 2 days) and allow the user to access the movie during this time. The time may start, for example, once the user has requested the movie or when the user first accesses the movie. Once the allotted time expires, the movie rental company may deny the user access to the movie until the user pays another fee.

Figure 2:
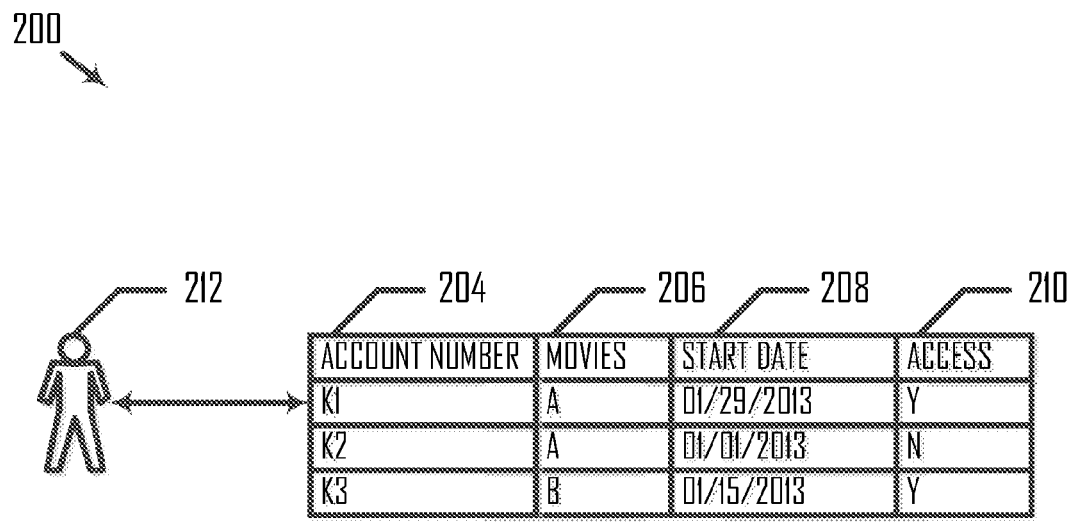
FIG. 2 is an illustration of a table in an in-memory data cache storing a plurality of keys and data associated with the plurality of keys, according to an embodiment.

FIG. 2 is an illustration of a table 200 in in-memory data cache 112A that stores a plurality of keys and data associated with the plurality of keys, according to an embodiment. Data associated with the plurality of keys may refer to values associated with the plurality of keys in in-memory data cache 112. Node 150 further includes an update module 114A that may enable storing, modifying, and extracting data from in-memory data cache 112A.

Table 200 includes an account number column 204, movies column 206, start date column 208, and access column 210. Account number column 204 includes account numbers that are assigned to customers. An account number may be a unique number given by the movie rental company to identify its customers. The account number may also be used as a primary key in table 200. A primary key may identify one or more columns in a table that make a row of data unique. The customer may receive the account number by, for example, registering with the movie rental company.

Movies column 206 includes movies that the customer has previously rented, start date column 208 indicates a date on which the user requested access to the movie, and access column 210 indicates whether the customer still has access to the movie. In table 200, a customer 212 having account number K1 requested access to movie A on Jan. 29, 2013 and still has access to movie A, a customer having account number K2 requested access to movie A on Jan. 1, 2013 and no longer has access to movie A, and a customer having account number K3 requested access to movie B on Jan. 15, 2013 and still has access to movie B.

a. Insert Keys into in-Memory Keys Cache

Referring back to FIG. 1, the following is a description of node 150. This description may apply as well to nodes 160, 170, and 180. Node 150 includes in-memory data cache 112A that stores a plurality of keys and data associated with the plurality of keys. Node 150 also includes in-memory keys cache 116A that stores keys associated with modified data.

Node 150 further includes a key insert module 118A and an update module 114A. In an embodiment, key insert module 118A detects a modification to in-memory data cache 112A and identifies one or more keys of the plurality of keys based on the modification. The identified one or more keys may be a primary key associated with the modified entry. Key insert module 118A may insert the identified one or more keys into in-memory keys cache 116A. Rather than replicating every modification of in-memory data cache 112A to remote site 104, in-memory keys cache 116A may store keys associated with the modified data, and retrieve and send the most up-to-date data associated with the keys to remote site 104.

Modified data may refer to the data that updates in-memory data cache 112A. A modification to in-memory data cache 112A may include an operation executed against in-memory data cache 112A, such as an insertion of an entry into in-memory data cache 112A, change of value in an entry in in-memory data cache 112A, or a deletion of an entry from in-memory data cache 112A.

Figure 3A:
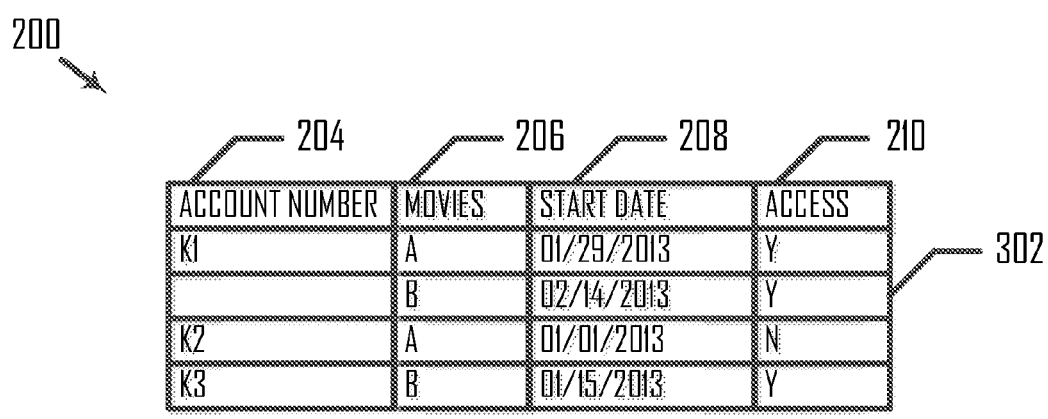
FIGS. 3A-3C are illustrations of modifications to a table in an in-memory data cache, according to an embodiment.

Referring to FIG. 3A, customer 212 may wish to rent movie "B" from the movie rental company. On Feb. 14, 2013, customer 212 may request access to movie "B" by, for example, logging into the movie rental company's website and requesting access to the movie. Doing so may modify table 200 by inserting an entry into table 200. The modified data may refer to at least some of the inserted data.

FIG. 3A is an illustration of a modification to table 200 in in-memory data cache 112A, according to an embodiment. In FIG. 3A, the modification to table 200 includes a new entry 302 indicating that on Feb. 14, 2013, user 212 requested access to movie B and has access to the movie. Key insert module 118A may detect the insertion of entry 302 into table 200. Account number K1 is the primary key associated with inserted entry 302. Accordingly, key insert module 118A may identify account number K1 as a key to insert into in-memory keys cache 116A based on the modification and insert account number K1 into in-memory keys cache 116A.

Customer 212 may have had access to movie B for the maximum amount of allotted time, and the movie rental company may want to deny customer 212 access to movie B. Denying customer 212 access to movie B may include changing in entry 302 the "Y" in access column 210 to "N". Doing so may modify table 200 by changing a value in entry 302 in in-memory data cache 112A. If customer 212 pays another fee, the movie rental company may allow customer 212 to access the movie. The modified data may refer to the data that updated in-memory data cache 112A (e.g., "N" in access column 210).

Figures 3B, 3C:

FIG. 3B is an illustration of another modification to table 200 in in-memory data cache 112A, according to an embodiment. In FIG. 3B, the modification to table 200 includes changing the "Y" in access column 210 to "N" 304 in entry 302. Key insert module 118A may detect the modification of entry 302 in table 200. Account number K1 is the primary key associated with modified entry 302. Accordingly, key insert module 118A may identify account number K1 as a key to insert into in-memory keys cache 116A based on the modification and may insert account number K1 into in-memory keys cache 116A.

Customer 212 may no longer wish to be a customer of the movie rental company and decide to delete his account. Customer 212 may log into the movie rental company's website and delete his account. Doing so may modify table 200 by deleting an entry from table 200. The modified data may refer to the data that was deleted from in-memory data cache 112A.

FIG. 3C is an illustration of another modification to table 200 in in-memory data cache 112A, according to an embodiment. In FIG. 3C, the modification to table 200 includes deleted entries including account number K1. In FIG. 3C, table 200 does not include any entries including account number K1. Key insert module 118A may detect the deletion of the entries in table 200. Account number K1 is the primary key associated with the modified entries. Accordingly, key insert module 118A may identify account number K1 as a key to insert into in-memory keys cache 116A based on the modification and insert account number K1 into in-memory keys cache 116A.

Although key insert module 118A has been described as identifying the account number as the key to insert into in-memory keys cache 116A, other identifiers in table 200 may be identified as the key to insert into in-memory keys cache 116A. Any identifier that is unique and able to uniquely identify the associated data may be used as the key.

Further for simplicity, the modifications described above affected one key, K1, in table 200. Another modification, however, may affect more than one table and the one or more keys identified based on the modification may include hundreds of keys.

In an embodiment, update module 114A retrieves from in-memory keys cache 116A a set of keys, retrieves from an in-memory data cache (e.g., in-memory data caches 112A, 112B, 112C, or 112D) modified data associated with the set of keys, and transmits to remote site 104 a modification list including the set of keys and the modified data associated with the set of keys. In an embodiment, each unique key is replicated only once to reduce bandwidth requirements. More details on key replication are below.

At least one node in remote site 104 may be updated using the set of keys and the modified data associated with the set of keys. In an example, site 104 includes a site master that receives updates (e.g., the modification list) and forwards the updates to the owner nodes of the respective keys. The site master may apply an assignment function (e.g., hash function) to determine which nodes own which keys. More details on key ownership are below.

1. Backup Instances Local to the Site

If node 150 in site 102 detects a modification to in-memory data cache 112A, node 150 may wish to broadcast this update to a set of local backup instances in site 102. The set of backup instances may be a subset of nodes in site 102. In an example, update module 114A transmits to a subset of nodes in site 102 (e.g., nodes 160, 170, and/or 180) a <key, value> update message including the identified one or more keys and the modified data associated with the identified one or more keys. In this way, if node 150 crashes, the set of local backup instances in local site 102 has a copy of the identified one or more keys and the modified data associated with the identified one or more keys.

One or more nodes in the set of backup instances in local site 102 may transmit to the remote site the modification list including the identified one or more keys and the modified data associated with the identified one or more keys. Further, transmitting the <key, value> update message to the set of backup instances in local site 102 may provide a high reliability that no updates to in-memory data cache 112A are lost.

In an embodiment, each key included in the <key, value> update message is listed only once. In an example, if data associated with key K1 has been modified twenty times, data associated with key K2 has been modified three times, and data associated with key K3 has been modified once, update module 114A broadcasts to the set of backup instances in local site 102 the <key, value> update message including [K1, K2, K3] and the most recent modified data associated with these keys. In this way, update module 114A may transmit the most up-to-date modified data to the set of backup instances in local site 102 while transmitting less data compared to sending to the set of backup instances each modification that occurs to in-memory data cache 112A. Further, replicating each unique key only once reduces bandwidth requirements.

Node 160 of the set of backup instances in local site 102 may receive from update module 114A the <key, value> update message including one or more keys and the modified values associated with the one or more keys. For each key in the <key, value> update message, node 160 may determine whether the key is stored in in-memory keys cache 116B. When the key is determined to not be stored in in-memory keys cache 116B, key insert module 118B may insert the key into in-memory keys cache 116B. In contrast, when the key is determined to be stored in in-memory keys cache 116B, key insert module 118B identifies the modified data associated with the key included in the <key, value> update message, stores the identified modified data in in-memory data cache 112B, and discards the key. Accordingly, node 160 may have the most up-to-date data associated with the key. Further, it may be unnecessary for node 160 to store the key again in in-memory keys cache 116B. Update module 114A may also send the <key, value> update message to nodes 170 and 180. Nodes 170 and 180 may update their in-memory data cache and in-memory keys cache accordingly.

The in-memory data cache and/or in-memory keys cache in node 180 may be inactive because node 180 does not replicate data to remote site 104. These caches may store the updated data, but may be inactive with respect to sending data to remote site 104.

Node 150 in site 102 may send the <key, value> update message to any nodes local to site 102. In an example, node 150 sends the <key, value> update message to node 160. If a key included in the <key, value> update message is not present in in-memory data cache 112B, the key and its associated modified data may be a new entry into in-memory data cache 112B. Accordingly, the key and the data associated with the key may be inserted as a new entry into in-memory data cache 112B.

Alternatively, if a key included in the modification list is present in in-memory data cache 112B, the modified data included in the modification list may replace one or more values in in-memory data cache 112B. Accordingly, a key or data associated with the key in in-memory data cache 112B may be modified. Additionally, if a value included in the modification list is null, the associated key and data may be deleted from in-memory data cache 112B. Accordingly, in-memory data cache 112B may identify entries including the key and delete from its memory the identified entries.

In an embodiment, update module 114A in node 150 in site 102 broadcasts the <key, value> update message to each node local to site 102 (e.g., nodes 160, 170, and/or 180). In an example, each node in site 102 is in the set of backup instances in site 102. In another example, a subset of nodes in site 102 is in the set of backup instances in site 102. The subset of nodes in site 102 may be assigned to store the key along with its associated modified data. If a node that is in the set of backup instances in site 102 receives the <key, value> update message, the node may store the appropriate keys with its associated modified data. In contrast, if a node that is not in the set of backup instances receives the <key, value> update message, the node may discard the message.

In an embodiment, update module 114A in site 102 fetches from another node local to site 102 of the set of backup instances the data associated with a key. In an example, update module 114A may determine which local nodes are of the set of backup instances by applying a function. For instance, update module 114A may apply a consistent hash function, and given K as input may determine the one or more nodes in site 102 that store the <key, value> pair. Update module 114 may then retrieve data from the in-memory data cache of the determined local node.

2. Key Updaters Local to the Site

As discussed, node 150 in site 102 may send a <key, value> update message to one or more nodes local to site 102.

Node 150 may also send a <key> update message to one or more nodes local to site 102. In an example, if node 150 in site 102 detects a modification to in-memory data cache 112A, node 150 may wish to broadcast this update to a set of key updaters local to site 102. For instance, update module 114A may transmit to the set of key updaters in site 102 (e.g., nodes 160, 170, and/or 180) a <key> update message including the identified one or more keys based on a modification. In this way, if node 150 crashes, the set of key updaters has a copy of the keys that are associated with modified data, where the modified data has not yet been replicated to a remote site (e.g., site 104). Although node 180 is illustrated as not having a key updater, node 180 may still store the keys in "inactive" in-memory keys cache 116D. Node 180 may store the up-to-date keys but may be inactive with respect to sending updates to remote site 104. In an example, node 160 may retrieve the set of keys from node 180 to send to remote site 104.

It may be beneficial to send to the set of key updaters only the list of keys associated with the modified data and not include the modified data because the keys are small values (e.g., integers or longs) and are of minimal size, saving bandwidth and computing cycles. In an example, at least one node of the set of backup instances in site 102 is also of the set of key updaters in site 102. In another example, nodes of the set of backup instances in site 102 are mutually exclusive of nodes of the set of key updaters in site 102.

In an embodiment, each key included in the <key> update message is listed only once. In an example, if data associated with key K1 has been modified twenty times, data associated with key K2 has been modified three times, and data associated with key K3 has been modified once, update module 114A broadcasts the <key> update message including [K1, K2, K3] to the set of key updaters in site 102.

In an embodiment, nodes 160 and 170 in site 102 are of the set of key updaters. In an example, for each key in the <key> update message, node 160, 170 determines whether the key is stored in in-memory keys cache 116B, 116C. When the key is determined to not be stored in in-memory keys cache 116B, 116C, key insert module 118B, 118C may insert the key into in-memory keys cache 116B, 116C. In contrast, when the key is determined to be stored in in-memory keys cache 116B, 116C key insert module 118B, 118C discards the key. Accordingly, each key in the in-memory keys cache of a respective node may store a particular key only once. This is not intended to be limiting, and a node may store a key more than once. If a node stores a key more than once, the node may delete other instances of the key from the respective in-memory keys cache before the data to be replicated is sent to the remote site.

In an embodiment, update module 114A in node 150 in site 102 broadcasts the <key> update message to each node in site 102. In an example, each node in site 102 is in the set of key updaters in site 102. In another example, a subset of nodes in site 102 is in the set of key updaters in site 102. The subset of nodes in site 102 may be assigned to store the key. If a node that is in the set of key updaters in site 102 receives the <key> update message, the node in site 102 may store the appropriate keys. In contrast, if a node that is not in the set of key updaters in site 102 receives the <key> update message, the node in site 102 may discard the message.

Each node of the set of key updaters local to site 102 may be responsible for the same set of keys. In this way, different updates to the same key in site 102 may be transmitted to the same node.

In an embodiment, implementing the two-phase commit may include storing the keys associated with modified data in stable storage. The update module may periodically retrieve the keys and associated values and send the updates to the remote site(s). These actions may be performed in the background so that the replication is completed quickly. The set of key updaters local to site 102 may provide stable storage and a certain probability against node failures. Additionally, the work of updating the one or more remote sites (e.g., site 104) may be distributed among the set of key updaters.

In an example, the keys in in-memory keys cache 116 are stored in memory so that the keys are quickly retrievable. In another example, the keys in in-memory keys cache 116 are stored on disk. In another example, in-memory keys cache 116 is stored in a shared file system. Storing data to and reading data from the shared file system may not be as quick compared to having in-memory keys cache 116 stored in memory. For example, synchronizing to disk may entail a remote procedure call (e.g., with Network File System) and messaging between the nodes prolonging the time it takes to replicate data to a remote site.

In an example, the data in in-memory data cache 112A is stored in memory so that the data is quickly retrievable. Additionally, a portion of data associated with in-memory data cache 112A may be stored on disk.

B. Replicate Data to a Remote Site Using Keys Stored Locally in in-Memory Keys Cache Data from in-memory data cache 112 in site 102 (e.g., in-memory data caches 112A, 112B, 112C and/or 112D) may be asynchronously replicated to remote site 104 by using keys associated with modified data and stored locally in in-memory keys cache 116 in site 102 (e.g., in-memory keys cache 116A, 116B, 116C, and/or 116D). In an example, inserting into local in-memory keys cache 116A, 116B, 116C, 116D keys associated with modified data in site 102 enables the locally stored keys in the in-memory keys caches to track modifications to the local in-memory data caches and to easily identify the data to replicate and transmit to remote site 104. Further, the keys may typically be small values (e.g., integers or longs) that are stored in in-memory keys cache 116A, 116B, 116C, 116D in site 102. In this way, the updates to the local in-memory data caches may easily be collected and transmitted to one or more nodes in remote site 104. Further, no updates are lost unless the entire primary site (e.g., local site 102) crashes. Communication lost between sites 102 and 104 may not lead to data loss, but may trigger a resynchronization of the backup site (e.g., remote site 104) when connectivity is restored.

Figure 4:
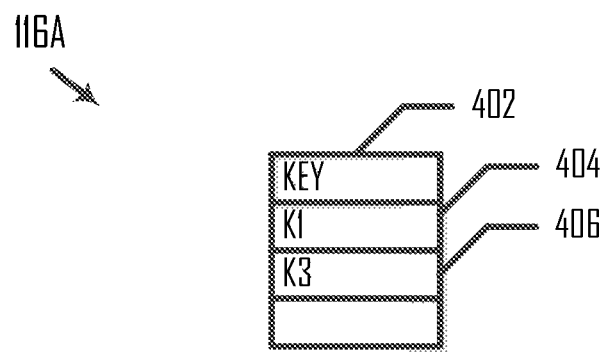
FIG. 4 is an illustration of in-memory keys cache in a site storing keys associated with a modification to an in-memory data cache local to the site, according to an embodiment.

FIG. 4 is an illustration of in-memory keys cache 116A in site 102 storing keys associated with a modification to an in-memory data cache in site 102, according to an embodiment. In-memory keys cache 116A may include one or more keys that are associated with a modification to in-memory data cache 112A, 112B, and/or 112C. In FIG. 4, in-memory keys cache 116A includes a key column 402 with two entries. A first entry 404 includes account number K1, and a second entry 406 includes account number K3. This may indicate that entries including these account numbers in table 200 of FIG. 2 were modified.

In an embodiment, update module 114A in site 102 retrieves from in-memory keys cache 116A a set of keys, retrieves from a local in-memory data cache (in-memory data cache 112A, 112B, 112C, and/or 112D) modified data associated with the set of keys, and transmits to remote site 104 a modification list including the set of keys and the modified data associated with the set of keys. Update module 114A may perform these actions in the background so that the replication is performed quickly. As an example and in reference to FIG. 4, update module 114A may retrieve from in-memory keys cache 116A keys K1 and K3 and retrieve from in-memory data cache 112A the modified data associated with these keys. Update module 114A may generate a modification list including keys K1 and K3 and the modified data associated with these keys and transmit the modification list to remote site 104.

Saving the keys associated with the modified data in the in-memory keys cache rather than the modified data or the operations executed against in-memory data cache 112A may use less memory. Maintaining the set of keys in the in-memory keys cache in site 102 to track modifications to in-memory data cache 112A, 112B, 112C, and/or 112D in site 102 may provide advantages compared to maintaining and transmitting to a remote site (e.g., site 104) a transaction log including the operations executed against the in-memory data cache. For example, if user 212 changes his address three times, the transaction log sent to the remote site would include these three modifications. In contrast, in the present disclosure, to replicate user 212's change of address to the remote site, update module 114A retrieves from in-memory keys cache 116A key K1 (user 212's account number), retrieves from an in-memory data cache the most recent address, and sends to the remote site the modification list including K1 and the most recent address. Because update module 114 retrieves the most up-to-date modified data associated with the keys in keys in-memory keys cache 116A, it may be unnecessary to transmit the three different address changes to the remote site.

In an embodiment, site 104 is the remote site and includes one or more site masters that receives updates (e.g., the modification list) and forwards the updates to the owner nodes of the respective keys. Multiple site masters may be used to mask transient failures of a site master. Requests may be load balanced to any site master, or a primary site master may be selected and a failover site master may be selected if the primary site master goes down. The appropriate site master may apply an assignment function (e.g., hash function) to determine which nodes own which keys.

In an example, node 190 in site 104 is the site master. Node 190 may determine that it and node 195 are to store the updates included in the modification list. Accordingly, in-memory data caches 190 and 192 in remote site 104 may be updated using the set of keys and the modified data associated with the set of keys included in the modification list. In this way, data from one or more in-memory data caches in site 102 may be asynchronously replicated to remote site 104. In an example, if a key included in the modification list is not present in in-memory data cache 190, the key and its associated modified data may be a new entry into in-memory data cache 190. Accordingly, the key and the data associated with the key may be inserted as a new entry into in-memory data cache 190.

Alternatively, if a key included in the modification list is present in in-memory data cache 190, the modified data included in the modification list may replace one or more values in in-memory data cache 190. Accordingly, a key or data associated with the key in in-memory data cache 190 may be modified. Additionally, if a value included in the modification list is null, the data associated with the key along with the key may be deleted from in-memory data cache 190. Accordingly, in-memory data cache 190 may identify entries including the key and delete from its memory the identified entries.

When a condition is satisfied, data in the in-memory keys cache may be replicated to the remote site. In an example, the condition is satisfied based on expiration of a timer. For instance, data may be replicated every 500 milliseconds. In another example, the condition is satisfied based on a threshold number of keys stored in the in-memory keys cache.

In-memory keys cache 116A, 116B, 116C, and/or 116D may store a plurality of keys based on modifications to in-memory data cache 112A, 112B, 112C, and/or 112D. In an embodiment, each node in site 102 may "own" a set of keys, and each update module in the respective node only transmits to the remote site keys and data associated with the keys that the respective update module owns. In an example, update module 114A retrieves from an in-memory keys cache the set of keys owned by node 150 in site 102, retrieves from an in-memory data cache the modified data associated with the set of keys owned by node 150 in site 102, and transmits to remote site 104 a modification list including the set of keys owned by update module 114A and the modified data associated with the set of keys owned by update module 114AA. Update module 114A may exclude from the modification list keys that are stored in in-memory keys cache 116A but not owned by node 150.

A node may own a key based on various determinations. In an example, a node owns a key based on an assignment function. Update module 114A may determine the set of keys stored in in-memory keys cache 116A to transmit to remote site 104 based on the assignment function. In an example, the assignment function is a hash function, and in-memory keys cache 116 includes one or more hash tables. Ownership may be determined based on a consistent hash function over the key set. For instance, update module 114A in node 150 in site 102 may apply a hash function to a key stored in in-memory keys cache 116A in node 150 to determine whether to transmit to the remote site the key and its associated data. Given keys [K1, K2, K3, K4, K5, K6, K7, K8, K9, K10] in site 102, update module 114A may process [K1, K2, and K3], update module 114B may process [K4, K5, K6, K7], and update module 114C may process [K8, K9, K10]. Although each of nodes 150, 160, and 170 may stores keys other than the ones it owns, update module 114A transmits to remote site 104 [K1, K2, K3] along with the data associated with these keys, update module 114B transmits to remote site 104 [K4, K5, K6, K7] along with the data associated with these keys, and update module 114C transmits to remote site 104 [K8, K9, K10] along with the data associated with these keys. This is merely an example, and there may be other ways to determine whether a node owns a key.

A transmit node in site 102 may transmit to remote node 190 and/or node 192 in site 104 the modification list including the set of keys and the modified data associated with the set of keys. In an example, the transmit node sends the modification list to the site master in remote site 104, and the site master forwards the updates to the owner nodes of the respective keys. The site master may be node 190, node 192, or another node in site 104 (not shown).

In response to receiving the modification list from the site master, the remote node in site 104 may send an acknowledgement to the transmit node in site 102 to signal successful completion of the replication. If the replication of data failed (e.g., if node 190 crashes before node 190 saved the data in the modification list), the node in site 104 that received the modification list may request from the site master in site 104 or the transmit node in remote site 102 that the modification list be sent again and/or may fail to send to the transmit node in site 102 an acknowledgement of successful completion of the replication. The transmit node in site 102 may then retry sending the modification list to the failed node.

In an example, if node 190 and node 192 receive a modification list including updates for their respective keys and node 190 successfully saves the data in the modification list and node 192 does not successfully save the data in the modification list, node 150 may send the modification list to only node 192 and it may be unnecessary to send the modification list to node 190. Accordingly, if node 150 receives from node 190 an acknowledgement that signals successful completion of the replication, node 150 may avoid sending to node 190 the modification list. This provides advantageous over synchronous replication because if one node fails, it may prevent the other nodes from committing that particular transaction. Further, asynchronous replication of in-memory caches may have a high quantity of nodes participating in the replication without significantly contributing to failure probability.

C. Remove Locally Stored Keys from in-Memory Keys Cache

After update module 114A transmits to remote site 104 the modification list, update module 114A may remove from in-memory keys cache 116A the transmitted set of keys. In this way, the next time update module 114A replicates data from the in-memory data cache to the remote site, update module 114A will not re-send to the remote site the previously transmitted information. In an embodiment, update module 114A removes from in-memory keys cache 116A the transmitted set of keys responsive to a notification that the data has been successfully replicated.

Update module 114A may also broadcast a message to nodes in site 102 to remove from the in-memory keys cache of the respective node the transmitted set of keys. In an embodiment, update module 114A broadcasts the message responsive to a notification that the data has been successfully replicated.

In this way, the other nodes in site 102 that store keys associated with modified data will also store the most up-to-date keys associated with data to be transmitted to the remote site. For example, if update module 114A in site 102 sends the <key, value> update message to M backup instance nodes local to site 102, update module 114A may notify the M backup instance nodes that the keys and modified data associated with the keys have been successfully replicated to the remote site. In response to the notification, the M backup instance nodes may remove from their respective in-memory keys cache the transmitted set of keys. Additionally, if update module 114A in site 102 sends the <key> update message to P key updaters local to site 102, update module 114A may notify the P key updaters that the modified data associated with the keys have been successfully replicated to the remote site. In response to the notification, the P key updaters may remove from their respective in-memory keys cache the transmitted set of keys. Accordingly, removing the transmitted set of keys from in-memory keys cache 116A may prevent duplicate data from being sent to the remote site.

After a key is removed from in-memory keys cache 116A, the key may be inserted again if the key is identified based on another modification to the local in-memory data cache. In an example, the modification to in-memory data cache 112A is part of a transaction. After key insert module 118A inserts the identified one or more keys into in-memory keys cache 116A, update module 114A commits the transaction. After update module 114A commits the transaction, update module 114A may transmit to the remote site the modification list including the set of keys and the data associated with the set of keys. Further, after update module 114A transmits to the remote site the modification list, update module 114A removes from in-memory keys cache 116A the transmitted set of keys.

Data stored in in-memory data cache 112A, 112B, 112C, and/or 112D of site 102 may be asynchronously replicated to remote site 104 based on the keys stored in the in-memory keys caches in site 102. If only one update module (e.g., update module 114A) transmits to site 104 the modification list including the keys and modified data associated with the keys, then all of the modifications may arrive at site 104 in total order. If more than one update module (e.g., update modules 114A, 114B, and 114C) transmit to site 104 the modification list, then a First-In, First-Out (FIFO) may be maintained (per key) so that the modifications are in order.

Node 190 and/or node 195 in site 104 may send to site 102 (e.g., to node 150) an acknowledgement of the modification list. After node 150 receives the acknowledgement from nodes 190 and/or 195 in site 104, node 150 may send a communication to a subset of nodes in site 102 to cause the subset of nodes to remove from the in-memory keys cache the transmitted set of keys. In an example, if in-memory keys cache 116A in node 150 in site 102, in-memory keys cache 116B in node 160 in site 102, and in-memory keys cache 116C in node 170 in site 102 store key K1, and update module 114A owns key K1 and transmits to remote site 104 the modification list including key K1 and receives an acknowledgement from remote site 104 that the replication was successful, then update module 114A may transmit to local nodes 160, 170, 180 in site 102 a message that causes these nodes to remove from their respective in-memory keys cache key K1. In this way, the successfully transmitted keys may be removed from the in-memory keys cache and the data associated with the keys are prevented from being sent in duplicate to remote site 104.

When the nodes local to site 102 receive the communication from update module 114A to cause the nodes to remove from their respective in-memory keys cache the transmitted set of keys, the nodes may assume that the replication was successful and that these keys and the data associated with these keys do not need to be transmitted to remote site 104. Accordingly, the keys remain stored in in-memory keys cache until the associated replication is determined to be successful.

D. Crashed Node and New Node Local to the Site

Further, if a node in site 102 crashes, a subset of nodes in site 102 may determine which keys are owned by the crashed node so that another node local to site 102 may take over responsibility from the crashed node for transmitting the data associated with the keys. In an example, node 150 owns key K1. If node 150 crashes, a set of backup instances may transmit to a set of key updaters one or more keys and the modified data associated with the one or more keys that the set of backup instances received from update module 114A in node 150 in a <key, value> update message. In an embodiment, all the key updaters store all keys associated with modified data.

In another embodiment, all the key updaters store a subset of all keys associated with modified data.

In an example, node 160 in site 102 may receive from update module 114A a <key, value> update message including keys K1 and K3 and modified data associated with keys K1 and K3. If node 160 detects that node 150 has crashed, node 160 may transmit to node 170 keys K1 and K3 and/or the modified data associated with keys K1 and K3. In this way, another node local to site 102 may participate in ensuring that the keys associated with modified data (e.g., K1 and K3) are not lost. Additionally, update module 114B and/or 114C may take over update module 114A's duties and own keys K1 and/or K3. In an example, after node 150 crashes, update module 114C in node 170 takes over responsibility from local node 150 and owns key K1, and transmits to remote site 104 the modification list including key K1 and the modified data associated with key K1. In another example, after node 150 crashes, update module 114B in node 160 takes over responsibility from local node 150 and owns key K3, and transmits to remote site 104 the modification list including key K3 and the modified data associated with key K3.

Further, when a new node launches in local site 102, the keys owned by one or more nodes in site 102 may be rebalanced. In an example, the keys owned by each node in site 102 are rebalanced. The newly launched node in site 102 may take over responsibility from one or more local nodes in site 102 and own the keys previously owned by the one or more local nodes, and transmit to the remote site the modification list including the keys owned by the new node and the associated modified data.

Moreover, when a site goes down or updates fail for an extended period of time, a site may be marked offline. When the site comes back up, it may be synchronized with the data in other sites. In an example, if site 104 crashes and comes back up, the nodes in site 104 may be synchronized with the nodes in remote site 102. The newly started site may grab the state from a local or remote node, and the state may be transferred to the newly started site. A state transfer may include sending an update for all the keys (e.g., in-memory and on disk) in the primary site, and the mechanism already in place for replication may ensure that the updates are sent to the newly started site.

In an example, if node 190 in site 104 crashes and comes back up, one or more nodes in site 102 may send data to site 104 so that node 190 has the most up-to-date data. In an example, update module 114A in node 150 may retrieve from an in-memory data cache (e.g., in-memory data cache 112A, 112B, 112C, and/or 112D) a first set of keys owned by node 150 and data associated with the first set of keys, and transmit to site 104 a first state list including the first set of keys and the data associated with the first set of keys. Additionally, update module 114B in node 160 may retrieve from an in-memory data cache (e.g., in-memory data cache 112A, 112B, 112C, and/or 112D) a second set of keys owned by node 160 and data associated with the second set of keys, and transmit to site 104 a second state list including the second set of keys and the data associated with the second set of keys. In this way, portions of in-memory data caches 112A, 112B, 112C, and/or 112D may be sent to site 104 in parallel.

As discussed above and further emphasized here, FIG. 1 is merely an example, which should not unduly limit the scope of the claims. For example, it should be understood that one or more modules in FIG. 1 may be combined with another module. In an example, key insert module 118A and update module 114A are combined into one module. It should also be understood that one or more modules in FIG. 1 may be separated into more than one module. In an example, key insert module 118A is split into a first key insert module and a second key insert module.

Further, although block diagram 100 is described herein with reference to two sites, there may be more than two sites without departing from the spirit of the present disclosure.

Additionally, different replication mechanisms may be used between sites. For example, site 102 may be configured to backup data synchronously to site 104 and asynchronously to another site (not shown). The backup policy for each in-memory data cache may be defined in a configuration file residing at the node. Further, a system may have any number of sites, and each site may have any number of nodes.

III. Example Approach

A. Data Replication to a Remote Site

In an example, a local site includes seven nodes and three of the seven nodes are updaters. An updater may be chosen based on its rank in a group view (e.g., JGroups view). For example, if the seven nodes are nodes A, B, C, D, E, F, and G, then the first three may be updaters (A, B, and C). When a new view is installed, every member may determine, based on the view and its rank, whether the member is an updater. Each node may have the same sequence of views. Accordingly, the determination of whether a node is an updater may be purely local and an election process (e.g., involving messages being sent around) may be unnecessary. When a transaction commits (e.g., as part of the "prepare" phase of the two-phase commit), the node that is committing the transaction may broadcast an "update" message, including only the updated keys (not the modified data).

With respect to the two-phase commit, an update message may be broadcast upon the "prepare" message or the "commit" message. Broadcasting the update message upon the "prepare" message may include sending a second "commit" or "rollback" message. Broadcasting the update message upon the "commit" message may include the avoidance of blocking the transaction but risk the loss of the update if the node crashes before applying the final commit.

Each key may be listed only once. In an example, if a transaction has modified data associated with key K1 20 times, then modified data associated with key K2, and then modified data associated with key K3, the list is [K1, K2, K3]. It may be unnecessary to send the operation type (e.g., put, remove, replace) with the update message because the updaters will fetch the associated values later.

In an example, each node in the local site receives the update message, but only updaters A, B, and C store the keys. The updaters send an acknowledgement back to the sender and this may complete the transaction. An updater "owns" a key when the updater is responsible for replicating the key to the remote backup site(s). The updater may own a certain range of keys. The determination of which updater owns which keys may be made by using a consistent hash, mapping keys to updaters. For example, for keys [K1, K2, K3, K4, K5, K6, K7, K8, K9, K10], updater A may process [K1, K2, K3], updater B may process [K4, K5, K6, K7], and updater C may process [K8, K9, K10]. In another example, a set of nodes (N) may store modified keys in memory, and a set of updaters (K, where K<=N) may ship the modifications to the remote backup site(s). If K is one, then all modifications may arrive at the backup site(s) in total order. If K is greater than one, then a First-in-First-out (FIFO) order (per key) may be implemented.

Referring to "stable storage," as long as no more than N−1 updaters crash at exactly the same time the keys to be processed (replicated) are not lost. Further, if only a few updaters crash, new updaters may be picked immediately and the keys may be rebalanced to ensure that they are not lost.

After the keys associated with the modified data are stored in stable storage (e.g., in-memory keys cache 116), this data may be periodically sent to the remote backup site(s). Each updater in the local site may have a replication task that runs when, for example, a queue exceeds a certain number of keys or a timer expires. The updater may then send a replicate message including the keys and data associated with the keys to the site master(s), which in turn apply the updates in their local site(s). This may be performed using the site's configuration (e.g., asynchronously, synchronously, with or without a transaction). When done, the site master sends back an acknowledgement to the sender, signaling to the sender the successful completion of the update task.

A site having N updaters may provide a certain probability against node failures (e.g., stable storage). The N updaters may shoulder all of the updates, distributing the work among them. Further, the queues in the updaters only store a given key once. Accordingly, the key may be updated only once in the backup sites and may be included only once in the replicate message, saving bandwidth and CPU cycles. Further, bandwidth to the cloud or costs associated with the bandwidth used to ship updates to the cloud may be reduced. Additionally, storing only the keys and not their associated values in the updaters' queues may result in less memory usage. Updaters may be stateless (beyond storing the keys), as they fetch the current value when triggering an update to a remote site. The updater fetches the current value from the in-memory data cache. Further, each updater may be responsible for the same set of keys, so different updates to the same key end up in the same updater queue, so that updates are sent in an ordered way.

B. Example Queue Implementation

In an example, node 150 in site 102 includes three queues, a first queue "my-keys," a second queue "all-keys," and a third queue "pending keys" (not shown). The queues may be FIFO ordered and duplicate-free (e.g., a FIFO-ordered set). On reception of a message to update keys in in-memory keys cache 116A, node 150 determines whether it is a key updater. If node 150 determines that it is not a key updater, node 150 discards the update message. If node 150 determines that it is a key updater, node 150 may store the keys included in the update message. If no update to a remote site is in progress, node 150 inserts the keys into queue "all-keys" and inserts the keys that node 150 is responsible for into queue "my-keys." If an update to a remote site is in progress, however, node 150 inserts the keys into queue "pending-keys."

When a condition is satisfied (e.g., a timer expires or when a queue exceeds a threshold size), node 150 block insertions into queue "all-keys," fetches the keys from queue "my-keys" along with the data associated with the keys from queue "my-keys," and replicates them to the remote site(s). If the replication is successful, node 150 removes these keys from queue "my-keys." Node 150 may then process the keys in queue "pending-keys" by inserting these keys into queue "all-keys" and inserting the keys that node 150 is responsible for into queue "my-keys." Node 150 may then remove all keys from queue "pending-keys" and unblock insertions into queue "all-keys."

Further, responsive to a view change, node 150 may determine which keys in queue "all-keys" are to be processed by node 150 and insert these determined keys into queue "my-keys."

Node 150 may replicate data to a remote site by creating a replicate message containing a hashmap with keys and values. For each key, node 150 may fetch the value for the key from the local site and add the value to the hashmap. If the value is null, node 150 may mark the value as removed. Node 150 may send the replicate message to the site master(s) of the remote site(s) and wait for the acknowledgement of a successful replication. If node 150 receives the acknowledgement of a successful replication, node 150 may broadcast a remove message to local nodes in site 102 to remove those particular keys associated with the successfully replicated data.

In an example, node 150 in site 102 sends the remove message including the particular keys to nodes local to site 102. The local nodes that receive the remove message may determine whether they are updaters. If a node is not an updater, the node may discard the remove message. If the node is an updater, the node may remove the keys included in their respective queue "all-keys" to avoid data associated with the removed keys from being sent in duplicate to the remote site. The node may leave the keys in queue "pending-keys" because they might have been updated again meanwhile.

C. Conflict Resolution

If an update to the same key occurs in different sites, they may be inconsistent. To avoid this inconsistency, each updater may acquire local write locks (e.g., by using the lock application programming interface (API)) on the keys that are about to be replicated to the remote site. When the keys have been replicated, the local write locks on the keys are released. In this way, inconsistencies between the sites may be prevented.

In an embodiment, the last updater determines the updated value associated with a key K. In an example, updater A in London and updater B in New York City both want to replicate key K. Updater A tries to set K=V1, and updater B tries to set K=V2. Updater A write-locks K in London, and updater B write-locks K in New York City and sends the replicate (K, V2) message to London. Updater A sends the replicate (K, V1) message to New York City, and updater B times out trying to acquire the lock for K in London, releases the write-lock for K in New York City and sleeps (randomly) before retrying. Updater A acquires the lock in New York City and sets K=V1 in New York City, then releases the remote lock in New York City and the local lock in London. Updater B may wake up and retry. In an example, updater B fetches the value for K, which has been set as V1 by updater A, and locks it locally in New York City. Updater B sends the replicate (K, V2) message to London, acquires the lock in London and sets K=V2 both in London and New York City. Updater B then releases the remote and local lock. K is now V2 in London and New York City. In this way, K may be consistent across all sites.

VI. Example Method

Figure 5:
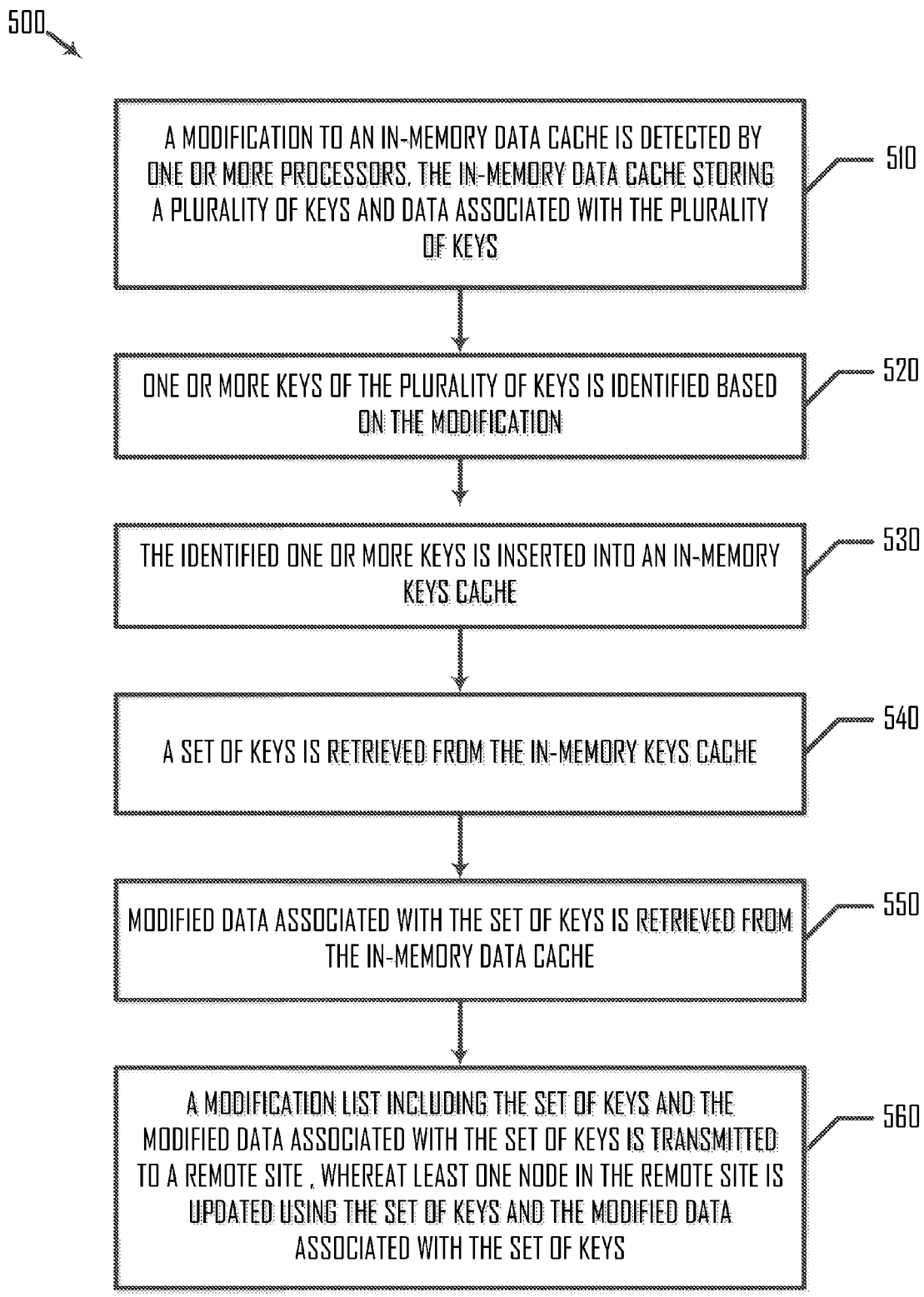
FIG. 5 is a simplified flowchart illustrating a method of replicating an in-memory data cache, according to an embodiment.

FIG. 5 is a simplified flowchart illustrating a method 500 of replicating an in-memory data cache, according to an embodiment. Method 500 is not meant to be limiting and may be used in other applications.

Method 500 includes steps 510-560. In a step 510, a modification to an in-memory data cache is detected by one or more processors, the in-memory data cache storing a plurality of keys and data associated with the plurality of keys. In an example, key insert module 118A detects, by one or more processors, a modification to an in-memory data cache, the in-memory data cache storing a plurality of keys and data associated with the plurality of keys.

In a step 520, one or more keys of the plurality of keys is identified based on the modification. In an example, key insert module 118 identifies one or more keys of the plurality of keys based on the modification.

In a step 530, the identified one or more keys is inserted into an in-memory keys cache. In an example, key insert module 118 inserts the identified one or more keys into an in-memory keys cache.

In a step 540, a set of keys is retrieved from the in-memory keys cache. In an example, update module 114 retrieves from the in-memory keys cache a set of keys.

In a step 550, modified data associated with the set of keys is retrieved from the in-memory data cache. In an example, update module 114 retrieves from the in-memory data cache modified data associated with the set of keys.

In a step 560, a modification list including the set of keys and the modified data associated with the set of keys is transmitted to a remote site, where at least one node in the remote site is updated using the set of keys and the modified data associated with the set of keys. In an example, update module 114 transmits to a remote site a modification list including the set of keys and the modified data associated with the set of keys, where at least one node in the remote site is updated using the set of keys and the modified data associated with the set of keys.

It is also understood that additional method steps may be performed before, during, or after steps 510-560 discussed above. For example, method 500 may include a step of removing from the in-memory keys cache the transmitted set of keys. It is also understood that one or more of the steps of method 500 described herein may be omitted, combined, or performed in a different sequence as desired.

V. Example Computing System

Figure 6:
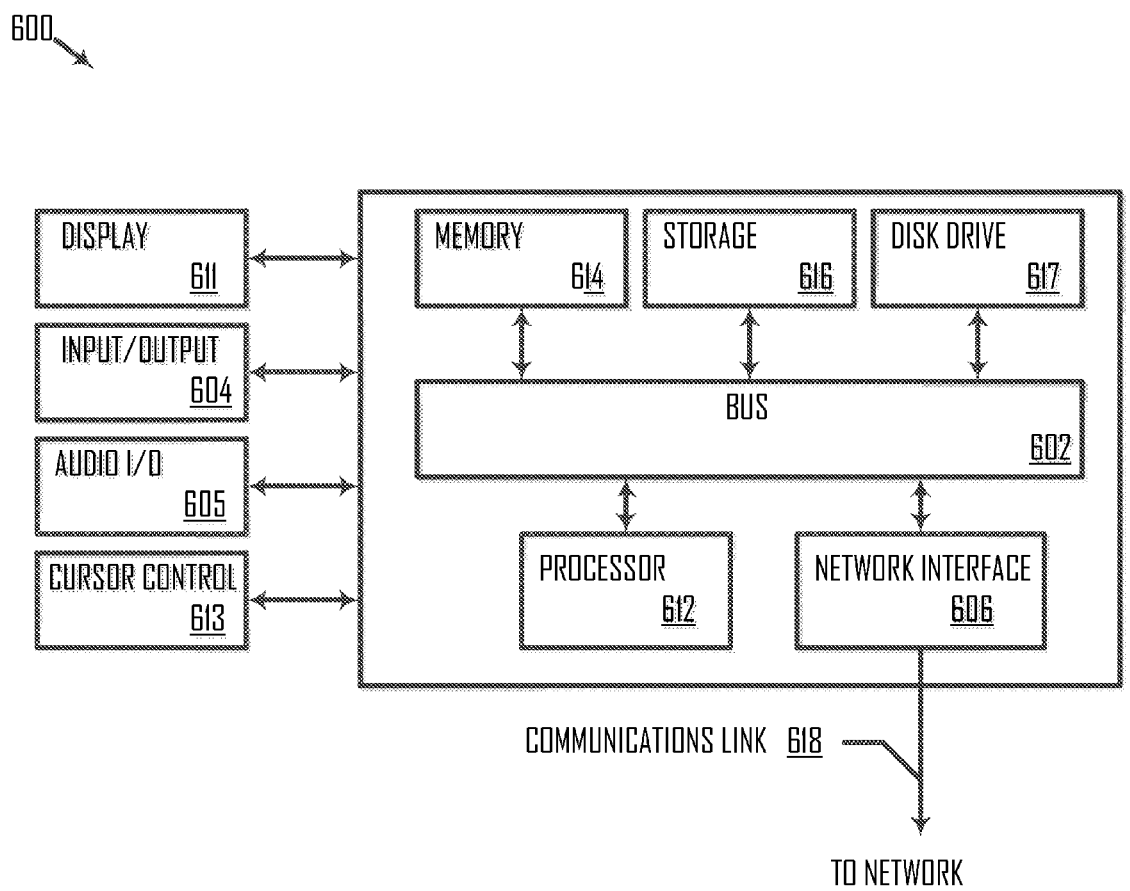
FIG. 6 is a block diagram of an electronic system suitable for implementing one or more embodiments of the present disclosure.

FIG. 6 is a block diagram of a computer system 600 suitable for implementing one or more embodiments of the present disclosure. The nodes described in this disclosure may include one or more processors. The nodes may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the node using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A system for replicating an in-memory data cache, the system comprising:
    an in-memory data cache that stores a plurality of keys and data associated with the plurality of keys;
    an in-memory keys cache that stores keys associated with modified data;
    a key insert module that detects a modification to a first set of data stored in the in-memory data cache, identifies a first set of keys of the plurality of keys identifying the first set of data, and responsive to the detected modification, inserts the first set of keys into the in-memory keys cache; and
    an update module that retrieves a subset of the first set of keys from the in-memory keys cache, retrieves from the in-memory data cache the modified data associated with the subset of keys, transmits to a remote site a modification list comprising the subset of keys and the modified data associated with the subset of keys, and receives an acknowledgement of successful replication in accordance with the modification list from the remote site,
    wherein in response to receiving the acknowledgement, the update module removes the subset of keys from the in-memory keys cache, wherein each key of the subset identifies data that has been modified in the in-memory data cache since a previously received acknowledgement of successful replication in accordance with a previously sent modification list;
    wherein at least one node in the remote site is updated using the set of keys and the modified data associated with the set of keys.

2. The system of claim 1, further comprising:
    a local site comprising a first node and a first subset of nodes,
    wherein the first node comprises the in-memory keys cache, key insert module, and update module, and
    wherein the update module transmits to the first subset of nodes the first set of keys and the modified data associated with the first set of keys.

3. The system of claim 2, wherein in response to receiving the acknowledgement, the update module sends a communication to the first subset of nodes to cause each node of the first subset of nodes to remove from an in-memory keys cache in the respective node the subset of keys.

4. The system of claim 2, wherein the local site further comprises a second subset of nodes, wherein the update module transmits to the second subset of nodes the first set of keys.

5. The system of claim 4, wherein when the first node crashes, at least one node of the first subset of nodes transmits to at least one node of the second subset of nodes the first set of keys and the modified data associated with the first set of keys.

6. The system of claim 2, wherein the first node comprises the in-memory data cache including a set of columns, and the key insert module detects the modification to the first set of data stored in the in-memory data cache when an entry is inserted into the in-memory data cache or when data stored in a column of the set of columns is modified.

7. The system of claim 2, wherein a second node of the first subset of nodes comprises the in-memory data cache.

8. The system of claim 1, wherein the key insert module identifies a second set of keys based on a second modification to a second set of data stored in the in-memory data cache, and for each given key of the second set of keys, the key insert module determines whether the given key is stored in the in-memory keys cache, wherein in response to a determination that the given key is not stored in the in-memory keys cache, the key insert module inserts the given key into the in-memory keys cache, and in response to a determination that the key is stored in the in-memory keys cache, the key insert module discards the key, and wherein the second set of keys is stored in the in-memory data cache and identifies the second set of data.

9. The system of claim 8, wherein the update module determines that a first set of remote nodes in the remote site has successfully replicated their in-memory data cache in accordance with the modification list and that a second set of remote nodes in the remote site has failed replication in accordance with the modification list, wherein in response to a determination that the second set of remote nodes has failed replication in accordance with the modification list, the update module retransmits the modification list to the second set of remote nodes, but not to the first set of remote nodes, and wherein the update module receives the acknowledgement of successful replication in accordance with the modification list from the remote site if the update module determines that the first and second sets of remote nodes in the remote site have successfully replicated their in-memory data cache in accordance with the modification list.

10. The system of claim 1, wherein the modification is part of a transaction, and after the key insert module inserts the first set of keys into the in-memory keys cache, the update module commits the transaction, and wherein after the update module commits the transaction, the update module transmits the modification list.

11. The system of claim 1, wherein the update module determines the subset of keys to transmit based on an assignment function.

12. The system of claim 1, wherein the key insert module tracks data modified in the in-memory cache by inserting any keys that identify the modified data into the in-memory keys cache.

13. A method of replicating an in-memory data cache, the method comprising:
    detecting, by one or more processors, a modification to a first set of data stored in an in-memory data cache, the in-memory data cache storing a plurality of keys and data associated with the plurality of keys;
    identifying a first set of keys of the plurality of keys based on the modification, wherein the first set of keys identify the modified data;
    responsive to detecting the modification, inserting the first set of keys into an in-memory keys cache;
    retrieving a subset of the first set of keys from the in-memory keys cache;
    retrieving from the in-memory data cache the modified data identified by the first set of keys;
    transmitting to a remote site a modification list comprising the subset of keys and the modified data associated with the subset of keys;
    receiving an acknowledgement of successful replication in accordance with the modification list from the remote site; and
    in response to receiving the acknowledgement, removing the subset of keys from the in-memory keys cache, wherein each key of the subset identifies data that has been modified in the in-memory data cache since a previously received acknowledgement of successful replication in accordance with a previously sent modification list, wherein at least one node in the remote site is updated using the set of keys and the modified data associated with the set of keys.

14. The method of claim 13, further comprising:
identifying a first subset of local nodes;
transmitting to the first subset of local nodes the first set of keys and the modified data associated with the first set of keys.

15. The method of claim 14, further comprising:
in response to receiving the acknowledgement, sending a communication to the first subset of local nodes to cause each node of the first subset of local nodes to remove from an in-memory keys cache in the respective node the subset of keys.

16. The method of claim 14, further comprising:
transmitting to a second subset of local nodes the first set of keys.

17. The method of claim 16, further comprising:
in response to receiving the acknowledgement, sending a communication to the first and second subsets of nodes to cause each node of the first and second subsets of nodes to remove from an in-memory keys cache in the respective node the subset of keys.

18. The method of claim 13, further comprising:
detecting a second modification to a second set of data stored in the in-memory data cache;
identifying a second set of keys of the plurality of keys based on the second modification; and
for each given key of the second set of keys:
determining whether the given key is stored in the in-memory keys cache;
in response to a determination that the given key is not stored in the in-memory keys cache, inserting the given key into the in-memory keys cache; and
in response to a determination that the given key is stored in the in-memory keys cache, discarding the key.

19. The method of claim 18, wherein a common key is included in the subset of keys and the second set of keys, wherein if the second modification is detected after the update module transmits the modification list, the modification list includes modified data of the first set of data identified by the common key and does not include modified data of the second set of data identified by the common key, and wherein if the second modification is detected before the update module transmits the modification list, the modification list includes modified data of the second set of data identified by the common key and does not include modified data of the first set of data identified by the common key.

20. A non-transitory machine-readable medium comprising a plurality of machine-readable instructions that when executed by one or more processors are adapted to cause the one or more processors to perform a method comprising:
detecting a modification a first set of data stored in an in-memory data cache, the in-memory data cache storing a plurality of keys and data associated with the plurality of keys;
identifying a first set of keys of the plurality of keys based on the modification, wherein the first set of keys identify the modified data;
responsive to detecting the modification, inserting the first set of keys into an in-memory keys cache;
retrieving a subset of the first set of keys from the in-memory keys cache;
retrieving from the in-memory data cache the modified data identified by the first set of keys;
transmitting to a remote site a modification list comprising the subset of keys and the modified data associated with the subset of keys;
receiving an acknowledgement of successful replication in accordance with the modification list from the remote site; and
in response to receiving the acknowledgement, removing the subset of keys from the in-memory keys cache, wherein each key of the subset identifies data that has been modified in the in-memory data cache since a previously received acknowledgement of successful replication in accordance with a previously sent modification list,
wherein at least one node in the remote site is updated using the set of keys and the modified data associated with the set of keys.

* * * * *